United States Patent [19]
Zaunberger

[11] Patent Number: 4,890,508
[45] Date of Patent: Jan. 2, 1990

[54] TRACKED VEHICLE DRIVE SYSTEM

[75] Inventor: Franz X. Zaunberger, Augsburg, Fed. Rep. of Germany

[73] Assignee: Renk Aktiengesellschaft, Augsburg, Fed. Rep. of Germany

[21] Appl. No.: 113,748

[22] Filed: Oct. 26, 1987

[30] Foreign Application Priority Data

Oct. 24, 1986 [DE] Fed. Rep. of Germany ....... 3636211
Oct. 24, 1986 [DE] Fed. Rep. of Germany ....... 3636267
Oct. 24, 1986 [DE] Fed. Rep. of Germany ....... 3636153

[51] Int. Cl.⁴ ..................... F16H 47/04; B62D 11/00; B62D 11/02; B62D 11/20
[52] U.S. Cl. ........................................ 74/687; 74/677; 74/720; 180/6.44; 180/6.7
[58] Field of Search ............ 74/665 G, 665 A, 665 T, 74/677, 682, 687, 720, 720.5, 473 R, 89.15, 471 R; 180/6.7, 6.44; 60/487, 488, 490, 491

[56] References Cited

U.S. PATENT DOCUMENTS

| | | | |
|---|---|---|---|
| 2,027,218 | 1/1936 | Armington | 74/720.5 |
| 3,010,342 | 11/1961 | Kelley | 74/720.5 |
| 3,250,151 | 5/1966 | Binger | 180/6.44 |
| 3,392,602 | 7/1968 | Frost | 180/6.44 |
| 3,532,006 | 10/1970 | Polak et al. | 74/720.5 |
| 3,576,066 | 4/1971 | Livezey et al. | 74/687 X |
| 4,215,755 | 8/1980 | Waterworth et al. | 180/6.44 |
| 4,327,603 | 5/1982 | Zaunberger et al. | 74/665 T |
| 4,420,991 | 12/1983 | Meyerle | 74/665 T X |
| 4,428,445 | 1/1984 | Zaunberger | 180/6.44 |

FOREIGN PATENT DOCUMENTS

| | | | |
|---|---|---|---|
| 860601 | 10/1952 | Fed. Rep. of Germany . | |
| 1174182 | 7/1964 | Fed. Rep. of Germany . | |
| 1929380 | 12/1970 | Fed. Rep. of Germany | 74/720.5 |
| 1480725 | 1/1976 | Fed. Rep. of Germany . | |
| 0576368 | 6/1976 | Switzerland | 180/6.44 |
| 0653162 | 3/1979 | U.S.S.R. | 180/6.44 |

Primary Examiner—Leslie A. Braun
Assistant Examiner—Harold F. Macris
Attorney, Agent, or Firm—Natter & Natter

[57] ABSTRACT

A drive system includes a vehicle propulsion device having a speed change gear box which drives tracks through a pair of planetary gears and a steering drive having a pair of variable hydrostatic drives. The hydrostatic drives engage a neutral shaft which superimposes rotation on the planetary gears to provide steering control for the tracks. The neutral shaft is separable into two segments. A differential reversing gear may be employed to selectively couple the neutral shaft segments. When the vehicle travels at high speed, the neutral shaft segments are coupled for unitary rotation. At low vehicle speeds, the propulsion drive is blocked and the neutral shaft segments are uncoupled so that both propulsion and steering are provided through the hydrostatic drives. For combined steering control and regulation of slow travel speeds as a function of the requirements of specific operating equipment carried by the vehicle, a control apparatus operates as a function of electrical signals for regulating travel speed and provides, through a linkage, adjustment of the hydrostatic unit controls and, in addition, superimposes upon the adjustment, modifications required for steering the vehicle.

4 Claims, 6 Drawing Sheets

TRACKED VEHICLE DRIVE SYSTEM

BACKROUND OF THE INVENTION

1. Field of the invention

The present invention relates generally to power transmission in tracked vehicles such as tanks and more specifically to a drive system wherein a hydrostatic steering drive is employable to provide vehicle propulsion and steering control at low speeds.

2. Backround art

Drive assemblies for tracked vehicles having a mechanical speed change gear box employed in a propulsion drive with an infinitely variable superimposed steering drive have been disclosed in U.S. Pat. No. 4,428,445, U.S. Pat. No. 4,327,603 and U.S. Pat. No. 4,280,579. In addition, tracked vehicle drive systems including steering drives having hydrostatic or hydrodynamic units for driving a neutral shaft were disclosed in U.S. Pat. No. 3,371,734 and the following patent documents of the Federal Republic of Germany; DEP 14 80 725, DEP 860,601; DAS 19 29 380; DOS 23 22 457 and DAS 11 74 182.

The vehicle drive systems of the past were incapable of providing both high speed vehicle travel, in the order of, for example, 60 km/hr with precise steering control at such high speeds while maintaining the ability to accurately drive the vehicle at relatively slow speeds, for example, in the order of 0.2 to 5.0 km/hr as may be neccesitated by special circumstances. In addition, prior drive systems lacked the ability to provide controlled driving in a straight direction without manual correction for ground conditions, for example, inclination or slope of the travel path or different driving resistances due to ground terrain and/or drive system component variations.

A further deficiency encoutered with prior drive systems related to control apparatus for steering and/or propulsion drives. In full track vehicles such as tanks, high demands were made of the power transmission systems including propulsion and steering drives as well as control apparatus for such drives. Such demands dealt primarily with efficiency and operation safety for both military reasons and accident avoidance. For safety purposes, it was desired to operate control elements through mechanical linkages yet control systems heretofore lacked the ability to provide mechanical steering linkage controls which could be automatically varied in position as a function of predetermined additional parameters.

SUMMARY OF THE INVENTION

A tracked vehicle drive system includes a propulsion drive and a steering drive. While the propulsion drive functions only to propel the vehicle by driving a pair of planetary gears which engage the tracks or chains, the steering drive functions to provide, at slow speeds, both steering and vehicle propulsion.

The steering drive includes a pair of hydrostatic drive units which engage a neutral shaft. The neutral shaft engages the planetary gears. With the vehicle drive system in a "travel" mode, e.g. when traveling at high speeds, the neutral shaft superimposes a steering control input on the planetary gears which are primarily driven through the propulsion drive.

At low speeds, with the drive system in a "work" mode, the neutral shaft is separated into segments each drivable by one of the hydrostatic units and the propulsion drive input to the planetary gears is blocked. A differential reversing gear having two couplings may be used for coupling the neutral shaft segments.

With both couplings open, the shaft segments are separated for slow speed vehicle propulsion and steering (work mode). When one coupling is closed with the other opened, the neutral shaft is unitarily coupled for superimposed steering control when the vehicle is propelled through the propulsion drive (travel mode). With one coupling open and the other closed, the reversing gear couples the segments for slow speed stabilized straight travel ("special work" mode) wherein the driving torque of the hydrostatic units are divided proportional to the different driving resistances at the tracks to provide the same speed for each track.

A control apparatus is provided for adjusting the position of the hydrostatic unit controls as a function of predetermined vehicle speed requirements mandated by equipment such as a mine detector. The control apparatus includes a rotatable driver mechanically linked to an operator steering control, and a pair of coaxial rotatable driven elements each mechanically linked to a control element of a steering drive. A concentric tube interconnects the driver and driven elements. The tube is axially displaceable relative to the driver element and includes teeth which engage coarse threads provided in the driven elements. The teeth are self locking such that rotation of the tube causes the driven elements to rotate. Translational movement of the tube results in superimposed rotation of the driven element due to the engagement of the teeth in the threads. A fluid linkage is provided to cause translational movement of the tube in response to predetermined values.

From the foregoing copendium, it will be appreciated that it is a consideration of the present invention to provide a tacked vehicle drive system of the general character described which is not, however, subject to the disadvantages of the backround art aforementioned.

It is a further consideration of the present invention to provide a tracked vehicle drive system of the general character described which is capable of furnishing high speed travel with good steering control and continuously variable speed propulsion at low vehicle speeds.

It is a feature of the present invention to provide a tracked vehicle drive system of the general character described which is capable of vehicle propulsion at low speeds along a straight course without deviations due to manufacturing tolerances of individual drive system components or ground conditions.

It is an aspect of the present invention to provide a tracked vehicle drive system of the general character described which is relatively low in cost and capable of economical mass production fabrication.

A further aspect of the present invention is to provide a tracked vehicle drive system of the general charcter described which is highly versatile and relatively simple in construction.

A further consideration of the present invention is to provide a tracked vehicle drive system of the general character described which utilizes different drives for high speed and low speed propulsion while utilizing the same steering linkage for steering control with either drive.

Another aspect of the present invention is to provide a tracked vehicle drive system of the general character described having a control element setting apparatus for operation of a control element as a function of both an operator steering control and predetermined vehicle requirements.

Another consideration of the present invention is to provide a tracked vehicle drive system of the general character described which assures that each of the vehicle's tracks are traveling at exactly the same speed.

An additional consideration of the present invention is to provide a tracked vehicle drive system of the general character described which includes a steering drive capable of providing forward vehicle propulsion.

A further aspect of the present invention is to provide a control element setting apparatus of the general character described which receives at least two desired setting signals and mechanically transmits to the control element a setting position which constitutes the differential thereof.

Other aspects, features and considerations of the invention in part will be obvious and part will be pointed out hereinafter.

With these ends in view, the invention finds embodiment in certain combinations of elements, arrangements of parts and series of steps by which the said aspects, features, and considerations and certain other aspects, features and considerations are hereinafter attained, all as fully described with reference to the accompanying drawings and the scope of which will be more particularly pointed out and indicated in the appended claims.

BRIEF DESCRIPTION OF THE DRAWINGS

In the accompanying drawings in which are shown some of the various possible exemplary embodiments of the invention;

FIG. 5 is a schematized block diagram illustrating control components drive system; and .

DESCRIPTION OF THE PREFERRED EMBODIMENTS

Figure 1:
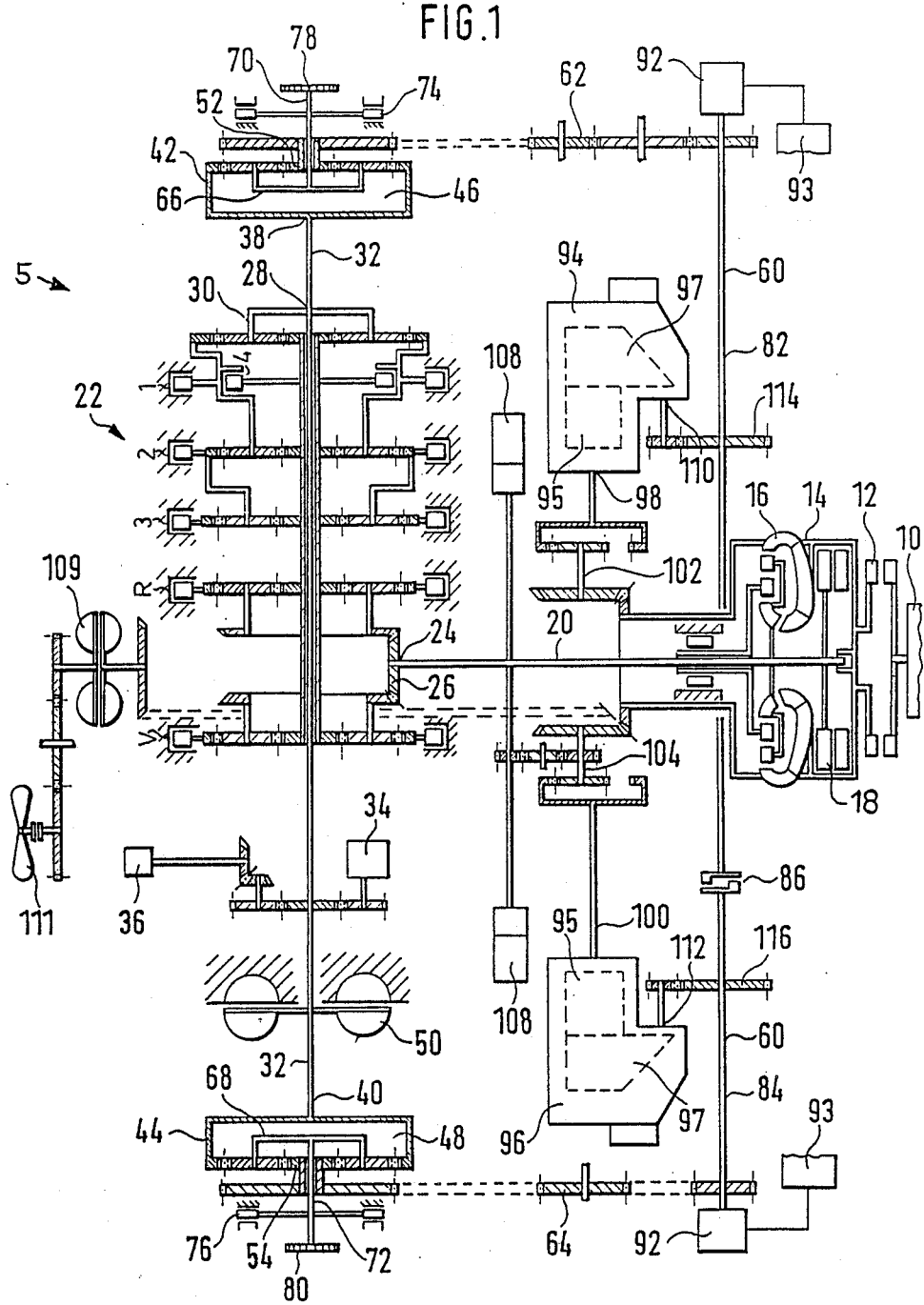
FIG. 1 is a schematized diagrammatic representation of a tracked vehicle drive system constructed in accordance with and embodying the invention and showing a propulsion drive engaging planetary gears and a steering drive which includes two hydrostatic units and a neutral shaft having a separable coupling.

In a tracked vehicle, the track chains are operated at the same speed when driving straight forward. When traversing a curve, however, they are driven at different speeds consistant with the radius of the curve. A drive system includes a propulsion drive including a speed change gearing, preferably shiftable under load for drive force (torque) transmission from an engine to chain wheels which engage track chains. The drive system also includes a steering drive having at least one hydrostatic unit with at least a fluid pump, driven by the engine and a fluid motor driven by the pump fluid. The output of the fluid motor can be varied by setting the delivery volume of the fluid pump. In addition with variable fluid motors, the motor itself may have control settings.

The fluid motor output engages a neutral shaft which does not rotate when the vehicle is traveling straight forward. Depending on whether the vehicle is traversing a right or left curve, the neutral shaft is driven by the fluid motor in one or the other direction. The neutral shaft rotation is superimposed on the rotation of the chain wheels through a summing planetary differential gear which interconnects the speed change gearing and each chain wheel. The chain wheels thus rotate at a speed which is a function of both the propulsion drive and steering drive outputs.

The neutral shaft is separable into segments for particular operating modes of the drive system. By separating the neutral shaft it is possible to drive the chain wheels solely through the neutral shaft segments with both segments having the same speed for straight travel and different speeds for traversing a curve. Under such conditions, the speed change gearing is rendered inoperative.

Referring now in detail to the drawings wherein like numerals denote like embodiments, the reference numeral 5 denotes generally a tracked vehicle drive system constructed in accordance with and embodying the invention. The drive system 5 is driven by a vehicle engine 10 which is coupled to the drive system through a coupling 12, e.g. a clutch. The coupling 12 is connected to an intermediate transmission element 14. The element 14 engages a propulsion drive shaft 20 through a hydrodynamic torque converter 16, or, alternately, the drive shaft 20 is driven through a bridge coupling 18.

The drive shaft 20 constitutes an input shaft of a propulsion drive. The propulsion drive includes a speed change gearing 22 which is shiftable under load. The speed chage gearing is driven through a beveled gear 26 fixed to an end 24 of the drive shaft 20. The speed chage gearing 22 includes a plurality of planetary gear sets having an output 28 at a planet carrier 30. The carrier 30 is nonrotatably connected to a drive shaft 32.

One end, 38, of the drive shaft 32 is connected to a cage 42 of a planetary gear (summing differential gear) 46. The other end, 40 of the drive shaft 32 is connected to a cage 44 of a summing differential gear 48. The drive shaft 32 is also connected to a secondary pump 34 and an impulse transmitter 36. In addition, the drive shaft 32 is connected to a hydrodynamic retarder brake 50 for the purpose of braking the vehicle.

A sun gear 52, 54 of the summing differential gear 46, 48 respectively is connected to a neutral shaft 60 of a steering drive through a gear train 62, 64 respectively. The gear train 62 contains one gear more than the gear train 64 so that the sun gears 52, 54 rotate in opposite directions.

A planet carrier 66, 68 of the summing differential gears 46, 48 respectively constitutes the output element of each differential gear. The carrier 66 is fixed to a shaft 70 to which a chain wheel 78 is secured. Similarly, the carrier 68 is fixed to a shaft 72 to which a chain wheel 80 is secured. On each of the shafts 70, 72, a mechanical vehicle brake 74, 76 respectively is positioned for vehicle braking.

It should be appreciated that with respect to each differential gear 46, 48 the cages 42, 44, planet carriers 66, 68 and sun gears 52, 54 may be substituted for one another with regard to their functions as driving element, driven element and reaction element.

In accordance with the invention, the neutral shaft 60 is separable into two segments 82, 84 which are connected to each other by a switchable coupling 86. With the coupling 86 closed, the shaft 60 functions as a single shaft. In order to ascertain the rate and direction of rotation of the shaft segments 82, 84, a rotation pickup 92 is associated with each segment and is interconnected to a control device 93.

Pursuant to the invention, the steering drive includes a pair of continuously variable hydrostatic units, 94, 96. The hydrostatic units, 94, 96 are driven through the intermediate driver 14 and a bevel gear arrangement having a pair of output shafts 102, 104. The shaft 102 is connected to an input of the hydrostatic unit 94 through an internal rim gear and the shaft 104 is connected to an input shaft 100 of the hydrostatic unit 96 through an internal rim gear.

Each of the hydrostatic units 94, 96 includes a variable fluid pump 95 which drives an fluid motor 97. Preferably, the outputs of the fluid motors 97 are variable.

An output 110 of the unit 94 is connected through a spur gear 114 with the neutral shaft segment 82 and an output 112 of the unit 95 is connected through a spur gear 116 to the neutral shaft segment 84.

The intermediate element 14 serves as a torque divider, distributing input power from the engine 10, through the coupling 12, to the propulsion drive shaft 20 and, to the inputs of the steering drive hydrostatic units 94, 96.

In addition, the driving torque from the intermediate element 14 is transmitted through a beveled gear (shown in dashed lines) to a ventilator 111 via a hydrodynamic coupling 109. A plurality of oil pumps 108, located on the primary side of the gear shift mechanism 22, are driven through the drive shaft 20.

The speed change gearing 22 is preferably shiftable under load. As such, the gear shift mechanisms can be switched while being coupled to the vehicle engine. The beveled gear 26 permits changing the gear shift mechanism from a forward drive, during which a switch coupling R is opened and a coupling V is closed, to a reverse drive by opening the coupling V and closing the switch coupling R. The speed change gearing 22 also has a switch coupling 1 for a first planetary gear, a switch coupling 2 for a second planetary gear, and a switch coupling 3 for a third planetary gear.

By opening the switch couplings V and R the speed change gearing 22 is physically separated from the propulsion drive shaft 20. By closing the switch couplings 1 and 4 for the first and fourth gears, the driven elements, that is, the cages 42, 44 of the differential gears 46, 48 are locked. The fourth gear coupling 4 interconnects the sun gear and cage of the first stage planetary gear.

Figure 2:
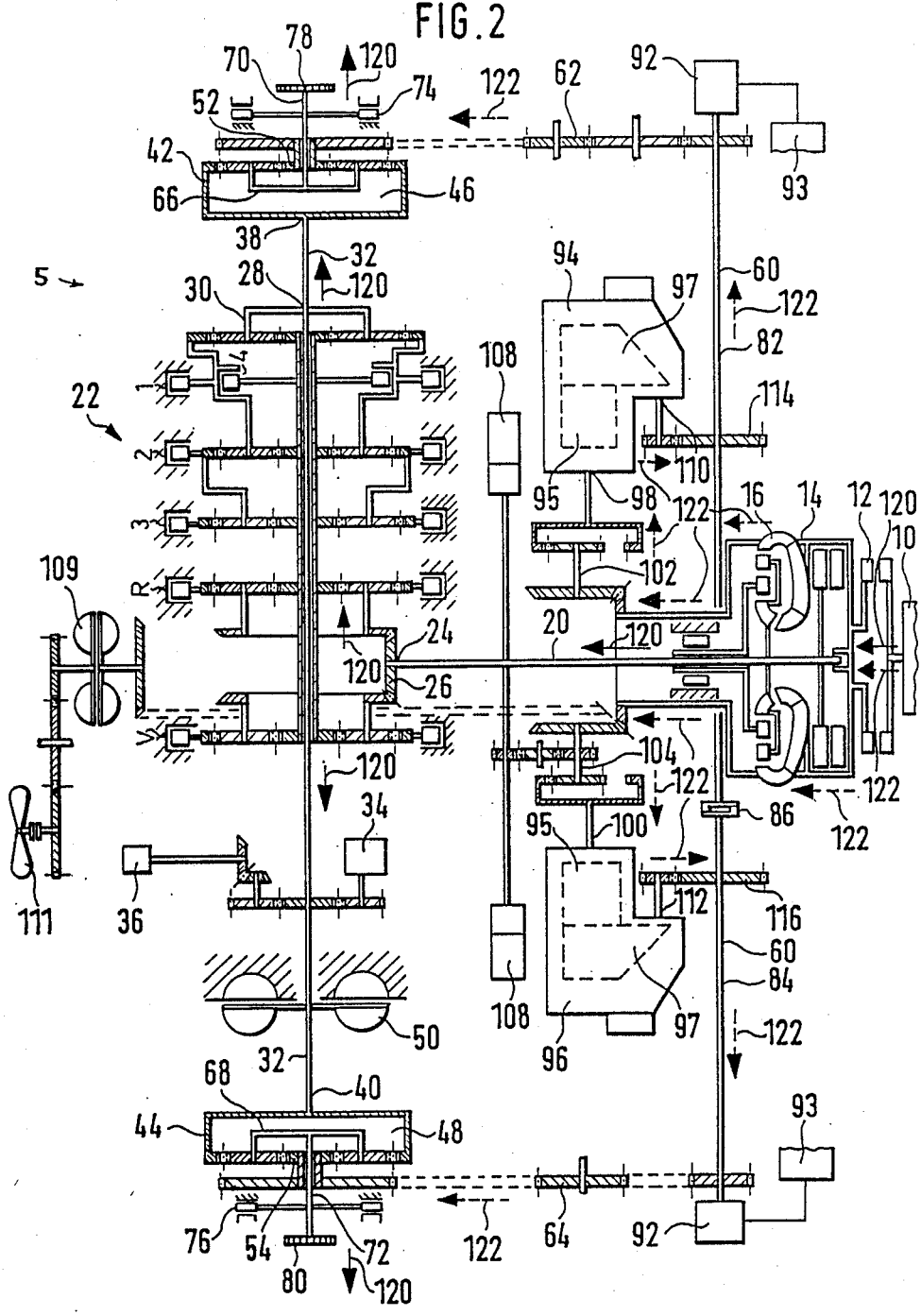
FIG. 2 is a schematized diagrammatic representation of the tracked vehicle drive system with the neutral shaft coupling closed for operating the vehicle in a high speed "travel" mode.

In FIG. 2 the tracked vehicle drive system 5 is illustrated in a configuration of operating in a travel mode for vehicle travel at relatively high speeds. It will be seen that the neutral shaft coupling 86 is closed and the segments 82, 84 of the shaft 60 rotate unitarily so that the shaft 60 functions as a single piece shaft.

The driving torque available at the coupling 12 is separated at the intermediate element 14 into a propulsion drive torque and a steering drive torque. The flow of the propulsion drive torque is indicated by plurality of heavy arrows designated by the numeral 120. The flow of the steering drive torque is illustrated by the dashed arrows designated 122. The drive torque flow 120 proceeds from the intermediate element 14 to the torque converter 16, to the speed change gearing 22 and from the speed change gearing through the differential gears 46 and 48 to the chain wheels 78, 80 which drive the chain tracks.

For vehicle steering control, the steering drive torque flow 122 proceeds from the intermediate element 14 to the hydrostatic units 94, 96. The torque flow is transmitted by the fluid pumps 95 to the fluid motors 97 and from the fluid motors, to the neutral shaft 60.

With the drive system 5 in the travel mode and the vehicle traveling along a straight course, the functionally one piece neutral shaft 60 does not rotate. This is accomplished by control of the fluid pump delivery volume and/or fluid motor setting device. When the vehicle is traversing a curved course, the neutral shaft is driven by the hydrostatic units 94, 96 in the same direction, with the direction of rotation being dependant upon the direction of turn. From the neutral shaft 60, the steering torque flows through the gear trains 62, 64 which drive the sun gears 52, 54 in opposite directions. During the travel mode of operation, the major portion of the drive torque is utilized for vehicle propulsion and is transmitted through the speed change gearing 22 and only a minor portion of the engine generated torque is utilized for steering. As a result, travel speed can be very high.

Figure 3:
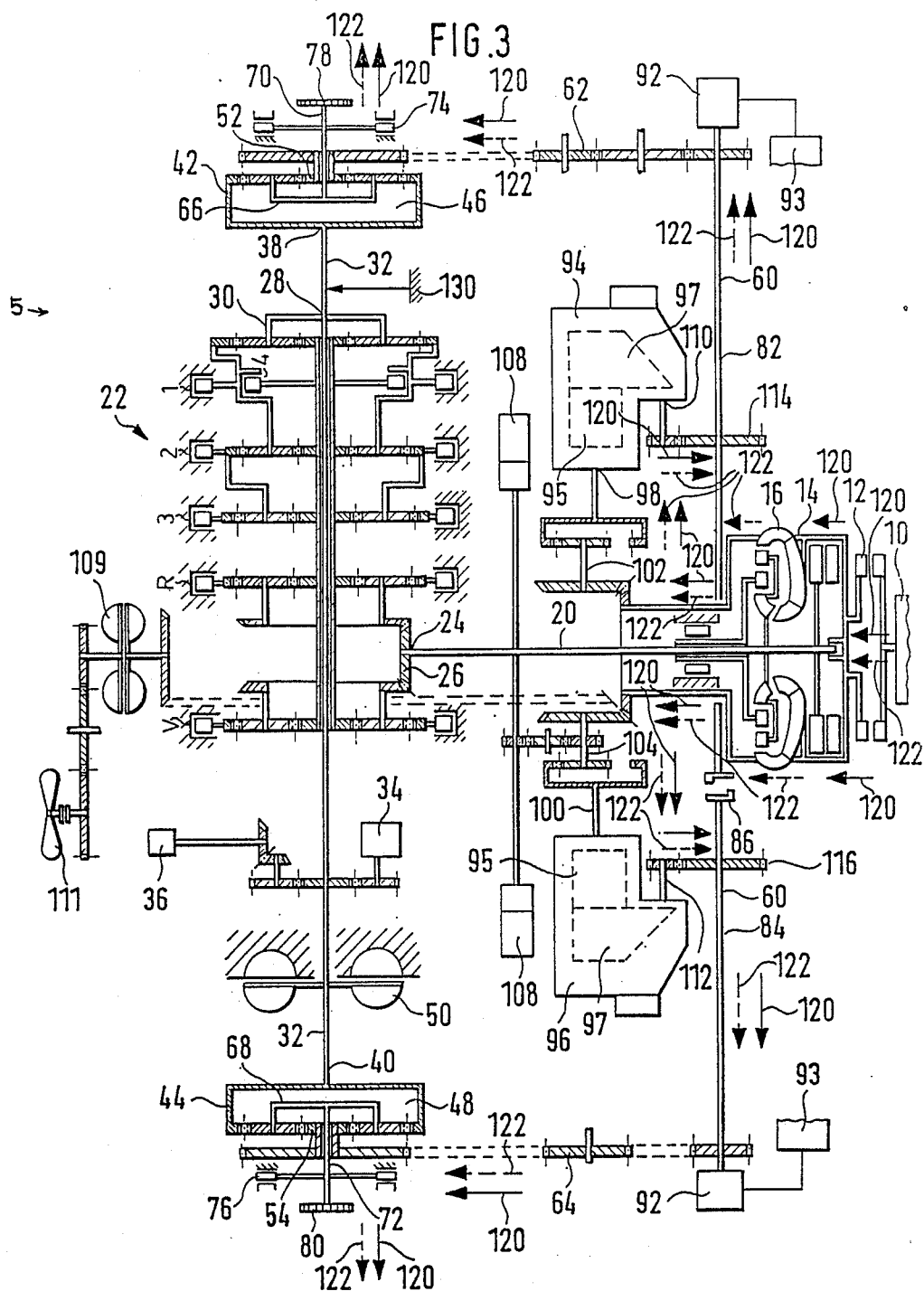
FIG. 3 is a schematized diagrammatic representation of the drive system with the neutral shaft coupling opened for a low speed "work" mode.

In FIG. 3 the drive system 2 is illustrated in an alternate operating mode, i.e. a work mode, wherein the vehicle is traversing at relatively low speeds. The neutral shaft coupling 86 is separated and the neutral shaft segments 82, 84 rotate independantly of each other. The steering drive torque flow 122 from the hydrostatic unit 94 is transmitted only to the neutral shaft segment 82 and the steering torque flow, 122 from the hydrostatic unit 96 is transmitted only to the neutral shaft segment 84. In addition, in the work mode, the planetary gear cages 42, 44 of the gears 46, 48 are blocked by closing the switch couplings 1 and 4 of the first planetary set. This is symbolically illustrated in FIG. 3 by the numeral 130 indicating an arrow from a frame component to the drive shaft 32. The drive shaft 32 can be blocked by utilizing a brake, key or other blocking components.

It should be additionally noted that the propulsion drive torque flow 120 at the speed change gearing end 24 of the drive shaft 20 is interrupted. Such interruption is accomplished by opening the switch couplings V and R. In lieu of or in addition to opening the couplings V and R, the propulsion torque flow 120 can be interrupted by emptying fluid from the torque converter 16 and opening the bridge coupling 18. The end objective is to assure that no propulsion torque flow 120 extends into the speed change gearing 22. Propulsion drive torque flows from the intermediate element 14, through the hydrostatic units 94, 96 to the respective neutral shaft segments, 82, 84. As a result, the hydrostatic units 94, 96 operate to propel the vehicle slowly during the work mode.

The driving torque and the steering torque can be divided through the hydrostatic units 94, 96 onto the chain wheels 78, 80 in a continuously variable manner. Under extreme driving situations, it is possible to transmit the entire torque generated by the vehicle engine 10 to only one chain wheel 78, or 80. In such a manner, it is possible to "tear loose" a vehicle track or chain which is stuck.

The versatility of power transmission through the hydrostatic units 94, 96 is such that the vehicle speed, in the work mode, can be reduced to zero or the specified optimum working speed of any auxiliary equipment carried on the vehicle. Such working equipment can include, mine sweepers, ditch digging devices or other equipment. Further, the driving speed and direction of the vehicle can be adjusted as a function of the working speed specifications of the auxiliary equipment by utilizing the rotation pickups 92 for determining the instantaneous speed values.

Figure 4:
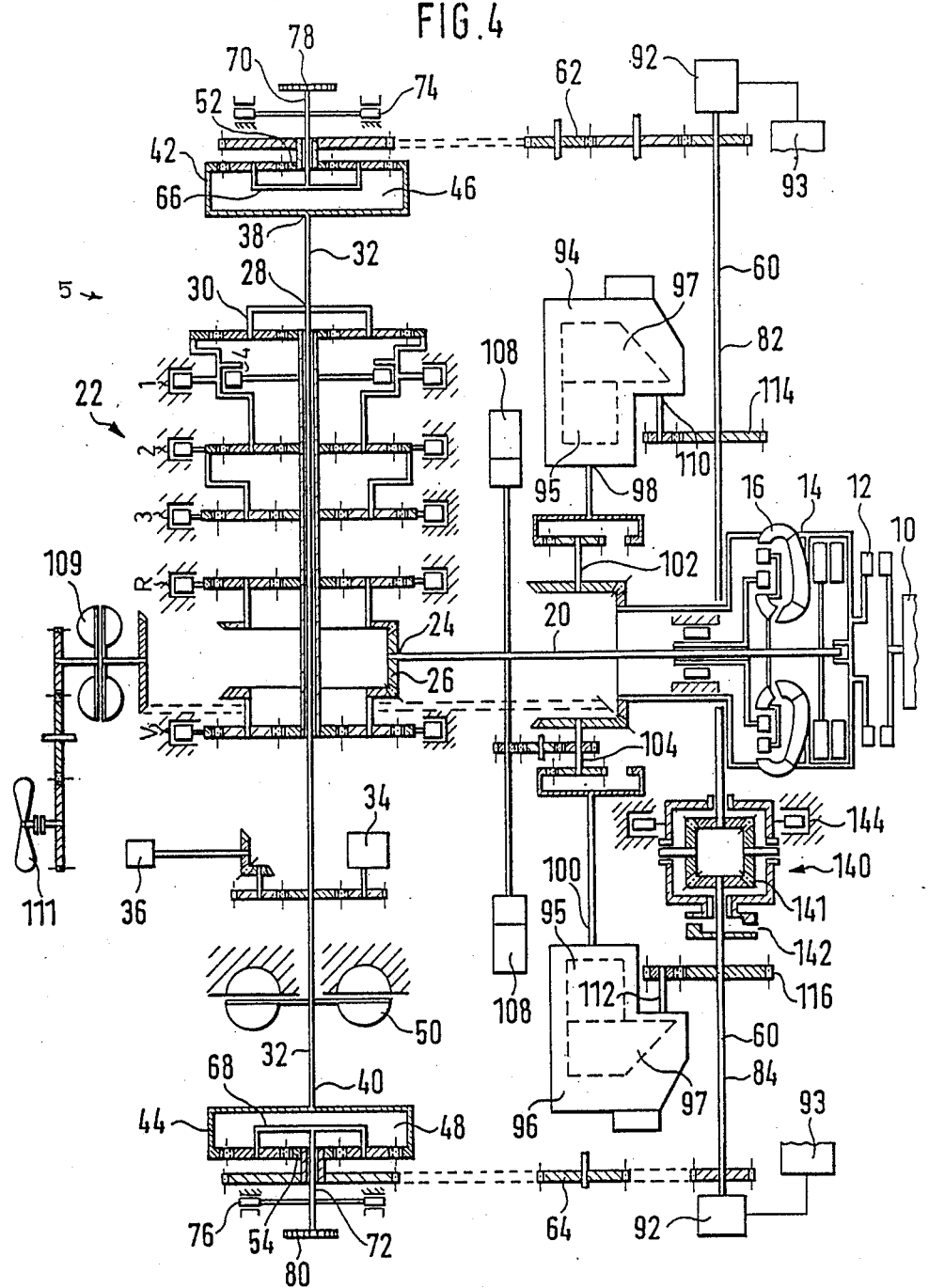
FIG. 4 is a schematized diagrammatic representation of a modified embodiment of the invention wherein a differential reversing gear having a pair of couplings is utilized to interconnect the neutral shaft segments to provide the capability of a "special work" mode of vehicle propulsion wherein the vehicle travels in a stabilized straight path.

In a further embodiment of the invention illustrated in FIG. 4, a differential reversing gear 140 is employed in lieu of the coupling 86 to interconnect the neutral shaft segments 82, 84. The differential reversing gear includes a reversing gear 141 comprising a matrix of intergaged bevel gears. In addition, the differential reversing gear 140 includes a switchable first coupling 142 joining a casing with the segment 84 and which is engagable to block the reversing gear 141 and provide a unitary connection between the neutral shaft segments 82, 84. The gear 140 also includes a second switchable coupling 144.

When the second coupling 144 is closed, the shaft segments 82, 84 rotate in opposite directions with respect to each other with the neutral shaft, however, functioning as a single unit. With the second coupling open, the differential reversing gear 140 will provide the travel and work modes. When the first coupling 142 is closed, the vehicle drive system is placed in the travel mode with the propulsion drive torque flow identical to that of FIG. 2. With the first coupling 142 opened, the vehicle drive system operates in the work mode and the torque force flows 120 and 122 identical to those illustrated in FIG. 3 result. During the work mode, the hydrostatic unit 94, 96 only drives its respective neutral shaft segments 82, 84. The units 94, 96 drive the segments 82, 84 during forward motion of the vehicle in rotational directions opposite to one another since a rotational direction reversal at the sun gears 52, 54 takes place due to the different number of gears in the gear train 62, 64.

In addition, a third operating mode of the vehicle drive system, the special work mode, is available when the first coupling 142 is opened and the second coupling 144 is closed. In such configuration, the neutral shaft segments 82, 84 are functionally connected through the reversing gear 140. They rotate, in opposite rotational directions and torque force flows substantially identical to those of the work mode and as illustrated in FIG. 3 are obtained. Significantly, however, the force flows 120 and 122 reinforce each other through the differential reversing gear 140 in such a way that the vehicle will only drive straight forward.

In the special work mode, the forward motion of the vehicle is stabilized because nonuniform drive resistances on the chains of the track vehicle and the force flows of the hydrostatic units 94, 96 are divided proportional to the chain wheel resistance through the reversing gear 141. As a result, both track chains drive with uniform travel speed. In extreme cases, both hydrostatic units, 94, 96 act together upon only one track chain. Thus, straight forward driving in the special work mode is insured even if the vehicle is driving on a slope or with one of the track chains on a slippery surface such as an ice covered surface. The chain wheels 78, 80 are always assured of having the same rotation speed. The special work mode of the vehicle drive system also assures that minor errors in setting the hydrostatic untis 94, 96 as well as errors in hydrostatic absorption capacity are automatically compensated.

Figure 5:
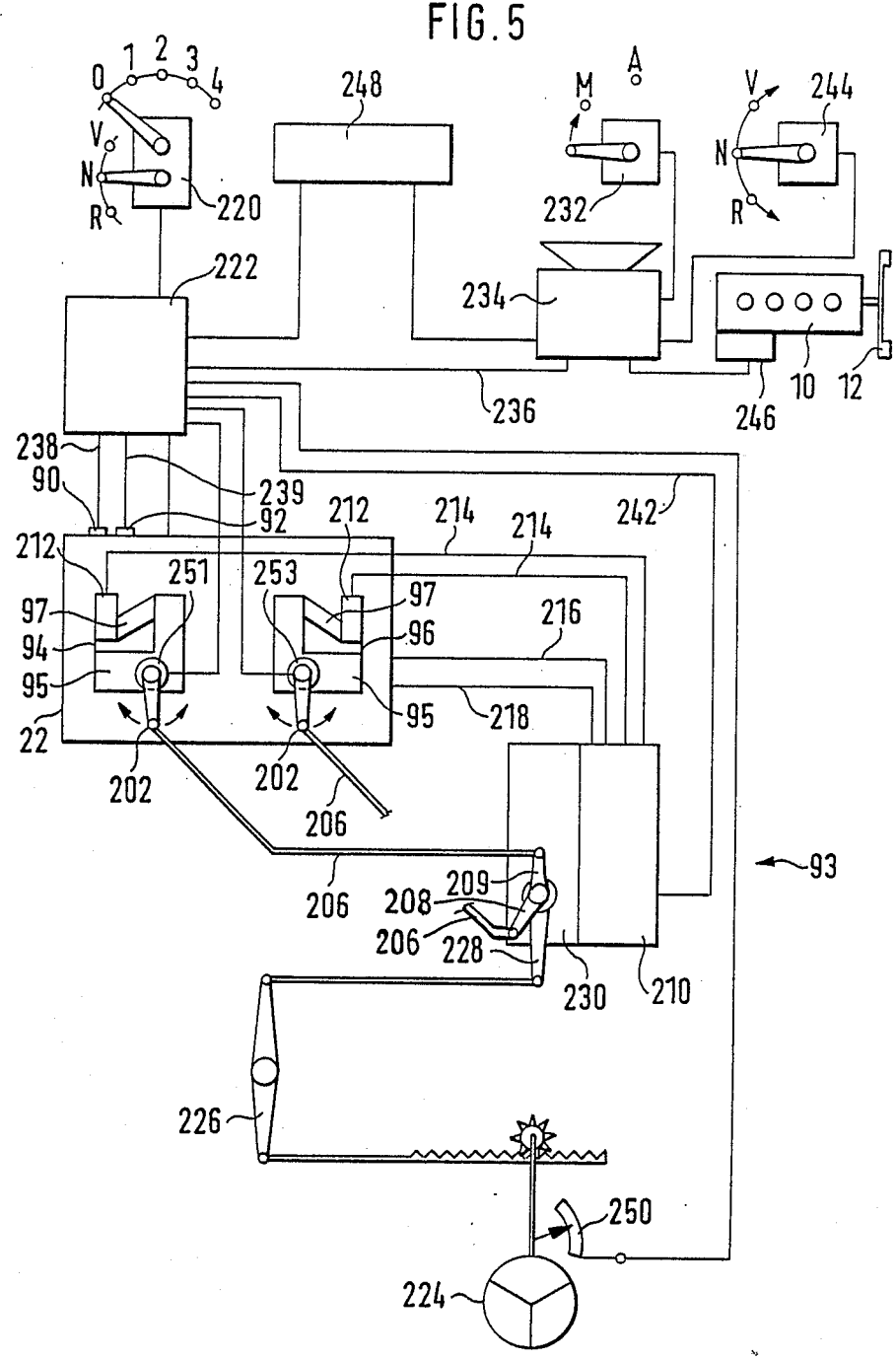

FIG. 5 illustrates details of the control unit 93. Schematically shown in such illustration are the fluid pumps 95 and the fluid motors 97 of the hydrostatic units, 94, 96. Each fluid pump 95 includes a control element 202 which comprises a volume setting lever. The levers 202 are each connected for adjustable rotational movement to an acuating lever 208, 209 of a setting apparatus 230 by a link arm 206. In addition, each of the fluid motors 97 has controls which are actuated by a setting device 212 for adjusting driven speed. The setting devices 212 are hydraulically actuated through a pair of fluid lines 214 from a control apparatus 210.

The control apparatus 210 is supplied with oil from the speed change gearing 22 through a supply line 216 while a return line 218 serves for discharge flow of oil back to the gearing 22. With the vehicle drive system operating in its travel mode as illustrated in FIG. 2, the speed change gearing 22 is switched through an electronic gear control circuit 222 which responds to the detected position of a speed selection switch 220.

The operator set position of a steering wheel 224 is mechanically transmitted through a linkage 226 to lever 228 of a setting apparatus 230. The setting apparatus 230, in a manner to be hereinafter described, mechanically transmits the steering control position of the steering wheel 224 to the control elements 202 of the fluid pumps 95.

With the vehicle drive system 5 in the work mode, the neutral shaft segments 82, 84 are functionally separated from each other and the propulsion drive torque flow does not proceed through the speed change gearing 22. Both the propulsion drive torque and the steering drive torque proceed through the hydrostatic units 94 and 96 to the neutral shaft segments 82, 84 and from such segments, to the differential gears 46 and 48. For this reason, the driving speed can not be set through the speed change gearing 22 but only through the hydrostatic units 94, 96. Thus, the control elements 202 of the fluid pumps 95 are now required to be set not only as a function of the steering wheel position but also as a function of the desired slow driving speed. The setting apparatus 230 serves to combine both the vehicle steering requirements of the wheel position and the driving speed requirements into hydrostatic unit control element positions.

A mode selection switch 232 is provided for operator selection of the travel or work modes of the vehicle drive system. In the travel position of the selection switch 232, the special work mode will be activated when the steering wheel is moved to a particular forward position. This results in automatically closing the second coupling 144 while the first coupling 142 remains open.

The mode selection switch 232 is coupled to a component of working equipment 234, e.g. a mine detector or other auxiliary working equipment, carried by the vehicle. During the work or special work mode of the drive system, a resulting signal indicative of the desired vehicle speed for the equipment is transmitted along a line 236 to the gear control circuit 222. The gear control circuit 222 includes a comparator which compares the desired speed signal value with the actual speed signal value (generated by the rotational pickups 92). A pair of electrical lines 238 and 239 interconnect the pickups 92 with the control circuit 222. The control circuit 222 then transmits an electrical speed setting signal to the control apparatus 210 through an electrical line 242.

The control apparatus 210 receives the speed setting signals and, the setting apparatus 230, converts such signals to mechanical setting values which are superimposed on the steering wheel setting values. As a function of such superimposition the control elements 202 of the hydrostatic units 94, 96 are moved into positions corresponding to the required speed of the vehicle as well as steering direction set at the steering wheel 224.

The desired vehicle speed for work and special work modes can be optionally set through a manual speed setting control 244. The working equipment 234 also transmits signals to an engine control device 246, e.g. throttle control, for adjustment of the vehicle engine speed in accordance with the requirements of the working equipment. The magnitude of the desired speed signal transmitted to the gear control circuit 222 along the line 236 constitutes a function of both the setting of the manual control 244 and the most appropriate constant engine speed. The vehicle is provided with an instrument panel 248 which serves to display, among other things, the operational states of both the working equipment 234 and the gear control circuit 222.

With the drive system in the work or special work operating modes, the highest vehicle driving speed is attained when the control elements 202 have reached their maximum settings. If at the highest vehicle speed, a curve is to be traversed, at least one of the two control elements 202 must be reduced to a lower speed so that a speed difference results between the track chains of the vehicle.

A sensor 250 is associated with the steering wheel and produces signals indicative of the steering wheel position. Such position signals are received at the gear control circuit 222 through an appropriate electrical line. The control apparatus 210, through the setting apparatus 230, serves to decrease the speed of one of the chain tracks only to the extent required for traversing the curve as set at the steering wheel. The position of the control element 202 associated with the hydrostatic unit 94 and the control element 202 associated with the hydrostatic unit 96 is sensed by an angle sensor 251, 253 respectively. The signals generated by such sensors are received at the gear control circuit 222 and are compared, in the gear control circuit, with the signal of the rotation pickups 92 in order to avoid hunting, i.e. overcompensation and adjustment fluctuations.

Figure 6:
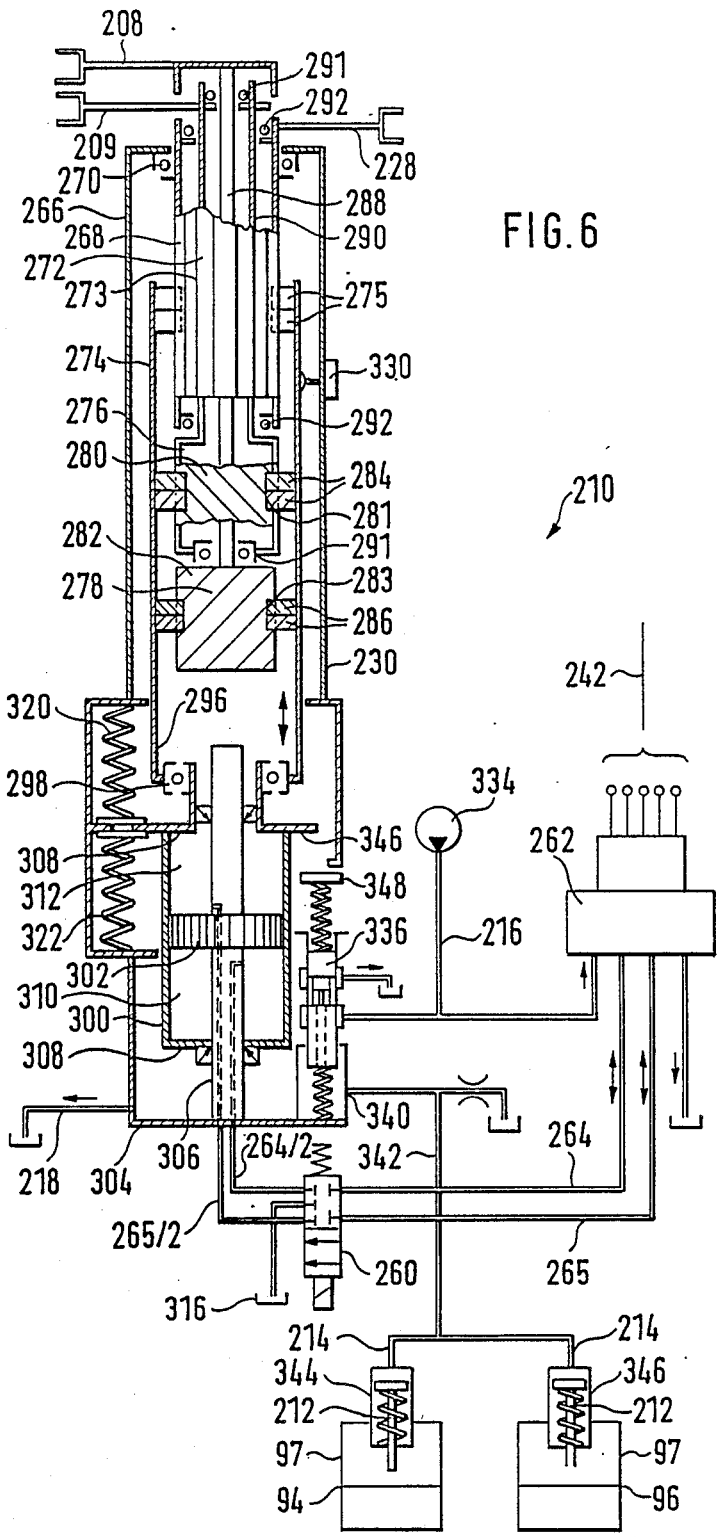
FIG. 6 is a fragmentary longitudinal sectional view through a control element setting apparatus for adjusting the position of the hydrostatic unit control elements.

Further details of the control apparatus 210 and the setting apparatus 230 are illustrated in FIG. 6. The control apparatus 210 includes the setting apparatus 230 and a proportional hydraulic valve 262 which is interconnected to the setting apparatus 230 through a switching valve 260. The proportional valve 262 comprises a valve known as a MOOG type valve and generates a pressure differential in a pair of hydraulic output lines 264, 265. The pressure differentials in the lines 264, 265 are generated as a function of the electrical signals appearing on the line 242 which extends from the gear control circuit 222. In actuality the line 242 constitutes a plurality discrete electrical signal lines. The pressure differential on the lines 264, 265 effects and maintains desired setting in the setting apparatus 230 which corresponds to the desired driving speed of the vehicle.

The setting apparatus 230 includes an elongate casing 266 within which a generally cylindrical driver 268 is coaxially carried. The driver 268 is rotatably mounted to the casing 266 through an upper bearing 270. Fixed to the upper end of the driver 268 is the steering wheel acuated control lever 228. Rotation of the steering wheel 224 results in corresponding rotation of the driver 268.

The surface of the driver 268 includes longitudinal keyways 272 and the driver projects into a coaxial connecting tube 274. Mounted to and projecting radially inward from the tube 274 are a plurality of keys 275 which are engaged in the keyways 272. As a result, the connecting tube 274 rotates with but is axially slidable relative to the driver 268.

Concentrically positioned within the driver 268 is a hollow driven element 290 and concentrically positioned within the driven element 290 is a further driven element 288. The actuating lever 208 is secured adjacent an end of the driven element 288 and the actuating lever 209 is secured adjacent an end of the driven element 290. At the opposite end of the driven element 290 there is an enlarged cylindrical zone 276 having a threaded section 280. Similarly, the driven element 288 includes an enlarged cylindrical zone 282 having a threaded section 278.

The threaded section 280 includes coarse threads 281 formed on its surface and the threaded section 278 includes coarse threads 283 on its surface. A pair of carrier teeth 284 projecting from the tube 274 engage the coarse threads 281 and a pair of carrier teeth 286 projecting from the tube 274 engage the coarse threads 283. When the connecting tube is moved axially relative to the driver 268, the engagement between the coarse threads 281, 283 and their respective carrier teeth 284, 286 result in rotation of the threaded sections, 280, 278, hence rotation of the driver elements 290 and 288 relative to the connecting tube 274.

The coarse threads 281, 283 are inclined in different rotational directions, i.e. one being a right handed thread and the other being a left handed thread, so that the threaded sections 280, 278 rotate in opposite directions. As previously mentioned, each of the threaded sections 280, 278 is part of a driven element 288, 290 respectively. The driven elements include the actuating levers 208, 209. As shown in FIG. 6, the driven element 288 constitutes a rod which extends through the cylindrical zone 276 and threaded section 280 of the driven element 290.

It should be appreciated that variations of the setting apparatus are invisioned wherein fewer or more than two threaded sections 276, 280 will be available. In addition, the coarse threads 281, 283 can extend in the same rotational direction depending upon the desired direction of movement of the actuating levers 208 and 209.

It should thus be appreciated that the connecting tube 274 serves to rotatably connect the driver element 268 with the driven elements 288, 290 through the threaded sections 278, 280. As a result, the driver element 268, the threaded sections 280, 278 and the connecting tube 274 are rotated together when the driver element 268 is rotated through steering wheel movement at the lever 228. Such rotation motion of the driver element 268 can be superimposed on the axial position of the connecting tube 274 in the work and special work modes of the vehicle drive system. The desired driving speed corresponds to a given connecting tube axial position in the work and special work modes. An axial displacement of the connecting tube 274 results in a corresponding rotation of the threaded sections 278, 280 due to the engagement between the carrier teeth 284, 286 and the threaded sections 278, 280. Such rotation of the threaded sections is in opposite directions of rotation with respect to each other and does not change the set position either angularly or axially of the driver 268. Because of the driver 268 is not affected, the rotational speed difference at the outputs 110 and 112 of the hydrostatic units 94 and 96 which is set for a particular curve will not be affected.

It should be noted that the coarse threads 281, 283 are self locking in the direction of rotation. Rotation of the connecting tube 274 due to rotation of the driver 268 does not result in rotation of the threaded sections 278, 280 relative to the connecting tube, but the two sections 278, 280 rotate together with the connecting tube 274, thus maintaining their angular positions relative to the connecting tube. Only axial displacement of the connecting tube 274 causes rotation of the threaded sections 278, 280. The keys 275 and the carrier teeth 284, 286 are preferably formed of two parts, rotatable relative to each other in a direction transverse to the longitudinal axis of the setting apparatus 230. As a result freeplay in the direction of rotation is eliminated.

The driven element 288 is rotatably mounted within the driven element 290 by a pair of bearings 291. Similarly the driven element 290 is rotatably mounted within the driver 268 by a pair of bearings 292.

In order to provide axial displacement of the connecting tube 274 relative to the driver element 268 and the threaded sections 280, 278 various systems may be utilized, including mechanical, hydraulic, pneumatic or electrical or any combination thereof. In the typical configuration illustrated in FIG. 6, the axial displacement of the connecting tube is hydraulically actuated as a function of electrical signals transmitted from the gear control circuit 222.

Beneath the connecting tube 274, a cylinder 300 is positioned. Adjacent the upper end of the cylinder 300, a lower zone 296 of the connecting tube 274 is rotatably coupled to the cylinder through a bearing 298. The bearing 298 permits only rotational movement between the cylinder and the connecting tube so that axial displacement of the cylinder 300 results in corresponding axial displacement of the connecting tube. A piston 302 is positioned in the cylinder 300 and the piston is fixed relative to a stationary base 304 of the outer casing 266 by a piston rod 306 which extends to an aperture in the cylinder bottom wall 308. The cylinder, piston and piston rod are coaxial with the connecting tube 274. The piston 302 divides the cylinder into an upper pressure chamber 312 and a lower pressure chamber 310.

A hydraulic line 264/2 constitutes a continuation of the line 264 between the switch valve 260 and the pressure chamber 310. Similarly, a line 265/2 extends as a continuation of the line 265 from the switch valve 260 to the pressure chamber 312.

The switch state of the valve 260 illustrated in FIG. 6 is that of the travel mode of the vehicle drive system. As such, the lines 264 and 265 are interrupted and the lines 264/2 and 265/2 are connected to a drain or sump 316. As a result, the pressure chambers 310, 312 are empty and a pair of springs 320, 322 maintain the cylinder, hence the connecting tube 274, in a central position. Rotation of the control element 228 is transmitted directly to the actuating levers 208 and 209 and a superimposition of other motions i.e. desired speed, does not take place.

For the control apparatus 210 to superimpose on the position of the lever 228 an additional value affecting the output of the hydrostatic units 94, 96, an electrical velocity signal is transmitted to the proportional valve 262 and a signal is transmitted to the switch valve 260. This occurs during the work and special work modes. When the switch valve 260 is so actuated, the hydraulic lines 264, 265 from the proportional valve 262 are directly connected to their associated lines 264/2 and 265/2 to introduce pressure fluid into the chambers 310, 312. The cylinder 310 is moved axially relative to the stationary piston 302. Such displacement of the cylinder 310 corresponds to the electrical signal transmitted to the proportional valve 262.

The connecting tube 274 moves in unison with the cylinder 300 and causes the threaded sections 276, 280 to rotate, hence the actuating levers 208, 209 will rotate. The rotational position of the levers 208, 209 correspond to a position in which the hydrostatic unit control elements 202 generate outputs corresponding to the desired driving speed.

When an operator rotates the steering wheel 224, the link 226 causes the lever 228 to correspondingly rotate. The rotation speed at the outputs 110, 112 of the hydrostatic units 94, 96 will then deviate from the velocity set by the axial displacement of the tube 274 in order to traverse the curve over which the vehicle is traveling.

A connecting tube sensor 330 is mounted to the casing 266 of the setting apparatus 230 and generates electrical signals as a function of the tube axial position, i.e. the set driving speed of the vehicle. The sensor may comprise any of various available position sensing devices such as an optical detector. The gear control circuit 222 receives the signal of the sensor 330 and determines whether a hydrostatic units 94, 96 are operating at their maximum output speed.

With the drive system in the work mode, propulsion is provided only through the hydrostatic units 94, 96. To turn the vehicle in response to a steering wheel setting, the hydrostatic unit which drives the chain on the outside arc of the curve must rotate at a faster speed than the hydrostatic unit which drives the chain on the inside arc of the curve. If a vehicle turn is indicated by the steering wheel setting when the signal received from the sensor 330 indicates that the hydrostatic units are at a maximum speed, the speed of the hydrostatic unit which drives the chain on the inside arc of the curve is reduced to effect the turn.

A source 334 of pressurized hydraulic fluid which may comprise pressurized fluid supplied through the secondary pump 34 or the pumps 108 of the speed change gear 22, supplies the proportional valve 262 with hydraulic fluid through a fluid line 216. An output 340 of a pressure reducing valve 336 is connected to the fluid lines 214 of the fluid motor setting devices 212 through a fluid line 342. The fluid lines 214 each supply fluid to a setting cylinder 344, 346 of one of the setting devices 212 for adjusting the driven speed of the respective fluid motor 97. In the lower and medium speed range of the vehicle, the hydraulic pressure in the cylinder 344 and 346, hence the setting of the fluid motors 97, is maintained at a constant value. With the vehicle drive system operating in the work or special work modes, in the upper speed range, a radial projection 346 adjacent the top of the cylinder 300 contacts an abutment actuator 348 of the proportional valve 336. Further downward displacement of the cylinder 300 causes the abutment actuator 348 to acutate the pressure reducing valve 336 and effect a change in the pressure of the fluid supply to the setting cylinders 344 and 346. As a result, the driving velocity of the vehicle is no longer determined by the setting of the fluid pumps 95 alone but additionally as a result of the adjustment setting of the fluid motors 97.

It should be appreciated that readily apparent modifications of the setting apparatus 230 can include replacing the cylinder 300 and piston 302 with an electric, hydraulic or pneumatic motor or displacement device or any other readily available setting elements. A significant advantage is that the electrical signal values generated by the gear control circuit 222 are converted to mechanical values and, as mechanical values are superimposed on the mechanical value of the steering setting lever 228. A further advantage of the present invention is that the angular adjustment of the lever 228 results in the generation of more than a single output motion which can be of different directions depending upon the number of threaded sections 278, 280 employed and can have different directions of movement, depending upon the pitch and thread direction of the coarse threads 281, 283.

Further, the control apparatus 210 and the setting apparatus 230 are not confined to applications in setting hydrostatic units but can be applied for the setting of many other devices which are required to be set as a fuction of at least two control values. Further, in accordance with the present invention, the setting apparatus 230 provides for purely mechanical transmission of the setting motions of the control lever 228 thus assuring a high degree of functional safety as compared with electrical, pneumatic or hydraulic apparatus.

Thus, it will be seen that there is provided a tracked vehicle drive system which achieves the various aspects, features and considerations of the present invention at which is well suited to meet the conditions of practical usage.

Since various possible embodiments might be made of the present invention and various changes might be made in the exemplory embodiments set forth, it is to be understood that all material shown and described in the accompanying drawings is to be interpreted as illustrative and not in a limiting sense.

Having thus described the invention there is claimed as new and desired to be secured by Letters Patent:

1. A tracked vehicle drive system, including:
    (a) a propulsion drive having a speed change gearing with an output,
    (b) a steering drive having hydrostatic torque transmitting means, the steering drive having an output,
    (c) means drivingly interconnecting an engine output with the propulsion drive and the steering drive,
    (d) a pair of summing differential gears, the gears each having a first input element and a second input element, means drivingly interconnecting the speed change gearing output with the first input element of each summing differential gear, means drivingly interconnecting the second input element of each summing differential gear with the steering drive output, each summing differential gear further having an output element, each output element rotating at a speed which is a function of the speeds of the two input elements, and
    (e) a neutral shaft and means connecting the second input element of each summing differential gear with the neutral shaft,
characterized in that:
    (f) the neutral shaft is comprised of segments, the drive system including switchable means for selectively interconnecting the neutral shaft segments, the segments being connected when the vehicle drive system is in a travel mode and being uncoupled when the drive system is in a work mode adapted for slow speed travel,
    (g) the speed change gearing is comprised of a multiple stage shiftable gearing and the means drivingly interconnecting the speed change gearing output with the first input element of each summing differential gear comprises a unitary propulsion drive shaft,
    (h) the hydrostatic torque transmitting means comprising two continuously variable hydrostatic units, the means drivingly interconnecting the engine output with the steering drive including means operatively engaging an input of each hydrostatic unit, the second input element of one summing differential gearing being nonreleasably drivingly engaged with the output of one hydrostatic unit and the second input element of the other summing differential gear being nonreleasably drivingly engaged with the output of another hydrostatic unit and,
    (i) the system further including means for selectively disengaging the speed change gearing from the means drivingly interconnecting the propulsion drive with the engine output and means for selectively blocking the first input element of the summing differential gears from rotating, the speed change gearing input being interrupted and the first input elements being blocked when the drive system is in a work mode, the steering drive transmitting, through the hydrostatic units, the propulsion drive torque for advancing the vehicle when in the work mode.

2. A tracked vehicle drive system constructed in accordance with claim 1 wherein the speed change gearing includes a forward and a reverse switchable coupling and switchable gear stages, the speed change gearing being selectively disengaged by opening the forward and reverse couplings and the first input elements being selectively blocked by simultaneously engaging two gear stages.

3. A tracked vehicle drive system, including:
    (a) a propulsion drive having a speed change gearing with an output,
    (b) a steering drive having hydrostatic torque transmitting means, the steering drive having an output,
    (c) means drivingly interconnecting an engine output with the propulsion drive and the steering drive,
    (d) a pair of summing differential gears, the gears each having a first input element and a second input element, means drivingly interconnecting the speed change gearing output with the first input element of each summing differential gear, means drivingly interconnecting the second input element of each summing differential gear with the steering drive output, each summing differential gear further having an output element, each output element rotating at a speed which is a function of the speeds of the two input elements, and (e) a neutral shaft and means connecting the second input element of each summing differential gear with the neutral shaft, characterized in that:

(f) the neutral shaft is comprised of segments, the drive system including switchable means for selectively interconnecting the neutral shaft segments, the segments being connected when the vehicle drive system is in a travel mode and being uncoupled when the drive system is in a work mode adapted for slow speed travel, (g) the hydrostatic torque transmitting means comprising two continuously variable hydrostatic units, the means drivingly interconnecting the engine output with the steering drive including means operatively engaging an input of each hydrostatic unit, the second input element of each summing differential gear being drivable by the output of a hydrostatic unit and (h) the system further including means for selectively disengaging the speed change gearing from the means drivingly interconnecting the propulsion drive with the engine output and means for selectively blocking the first input element of the summing differential gears from rotating the speed change gearing input being interrupted and the first input elements being blocked when the drive system is in a work mode, the steering drive transmitting, through the hydrostatic units, the propulsion drive torque for advancing the vehicle when in the word mode, (i) the means for selectively interconnecting the neutral shaft segments comprising a differential reversing gear having a reverse gear, a first coupling and a second coupling whereby when both couplings are open the neutral shaft segments are functionally separted for the work mode, when the first coupling is closed and the second coupling opened the neutral shaft segments are functionally connected for the travel mode and when the first coupling is opened and the second coupling is closed, the neutral shaft segments are functionally connected through the reversing gear for a stabilized word mode wherein the driving force is automatically apportioned over the neutral shaft segments for compensation of different resistances.

4. A tracked vehicle drive system, including:

(a) a propulsion drive having a speed change gearing with an output, (b) a steering drive having hydrostatic torque transmitting means, the steering drive having an output, (c) means drivingly interconnecting an engine output with the propulsion drive and the steering drive, (d) a pair of summing differential gears, the gears each having a first input element and a second input element, means drivingly interconnecting the speed change gearing output with the first input element of each summing differential gear, means drivingly interconnecting the second input element of each summing differential gear with the steering drive output, each summing differential gear further having an output element, each output element rotating at a speed which is a function of the speeds of the two input elements, and (e) a neutral shaft and means connecting the second input element of each summing differential gear with the neutral shaft, characterized in that:

(f) the neutral shaft is comprised of segments, the drive system including switchable means for selectively interconnecting the neutral shaft segments, the segments being connected when the vehicle drive system is in a travel mode and being uncoupled when the drive system is in a work mode adapted for slow speed travel, (g) the hydrostatic torque transmitting means comprising two continuously variable hydrostatic units, the means drivingly interconnecting the engine output with the steering drive including means operatively engaging an input of each hydrostatic unit, the second input element of each summing differential gear being drivable by the output of a hydrostatic unit, (h) the system further including means for selectively disengaging the speed change gearing from the means drivingly interconnecting the propulsion drive with the engine output and means for selectively blocking the first input element of the summing differential gears from rotating, the speed change gearing input being interrupted and the first input elements being blocked when the drive system is in a work mode, the steering drive transmitting, through the hydrostatic units, the propulsion drive torque for advancing the vehicle when in the work mode and (i) setting means for regulation of the vehicle driving speed and steering control, the setting means including:

(i) driver means and means mounting the driver means for rotation in response to the steering control, (ii) a driven element and means mounting the driven element for rotation coaxial with the driver means, means forming at least one coarse thread in the driven element, and means mechanically interconnecting the driven element with a control of a hydrostatic unit, (iii) a connecting tube, means mounting the connecting tube for rotation coaxial with the driver means and axially displaceable relative to the driver means, the tube having carrier means for engaging the coarse thread, the carrier means including means for effecting rotation of the driven element in response to axial displacement of the tube and for locking to prevent rotation of the driven element from axially displacing the tube, and (iv) means for axially displacing the tube in response to electrical signals corresponding to a travel speed to be set.

* * * * *